(12) United States Patent
Liao

(10) Patent No.: US 11,090,558 B2
(45) Date of Patent: Aug. 17, 2021

(54) GAMING CONTROLLER AND SUPPORT DEVICE THEREOF

(71) Applicant: Primax Electronics Ltd., Taipei (TW)

(72) Inventor: Zi-Hao Liao, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 222 days.

(21) Appl. No.: 16/448,933

(22) Filed: Jun. 21, 2019

(65) Prior Publication Data

US 2020/0282309 A1   Sep. 10, 2020

(30) Foreign Application Priority Data

Mar. 8, 2019   (CN) .......................... 201910176798.8

(51) Int. Cl.
| | |
|---|---|
| A63F 9/24 | (2006.01) |
| A63F 13/00 | (2014.01) |
| G07F 17/00 | (2006.01) |
| A63F 13/24 | (2014.01) |
| A63F 13/92 | (2014.01) |

(52) U.S. Cl.
CPC .............. *A63F 13/24* (2014.09); *A63F 13/92* (2014.09)

(58) Field of Classification Search
CPC ...................................................... A63F 13/24
See application file for complete search history.

(56) References Cited

U.S. PATENT DOCUMENTS

| | | | |
|---|---|---|---|
| 2004/0235566 A1* | 11/2004 | Hussaini | A63F 13/24 463/37 |
| 2005/0236536 A1* | 10/2005 | Fan | B60R 11/02 248/176.3 |
| 2006/0183511 A1* | 8/2006 | Shen | H04M 1/04 455/575.1 |
| 2016/0030838 A1* | 2/2016 | Hong | A63F 13/24 463/37 |
| 2017/0265313 A1* | 9/2017 | Deng | F16B 2/12 |

* cited by examiner

*Primary Examiner* — Milap Shah
*Assistant Examiner* — Jason Pinheiro
(74) *Attorney, Agent, or Firm* — Kirton McConkie; Evan R. Witt

(57) ABSTRACT

A gaming controller includes a main body and a support device. The support device includes a base member, a bracket assembly and a positioning member. The bracket assembly is installed on the base member and includes a first frame and a second frame. The first frame and the second frame are movable relative to the base member. The first frame includes plural positioning holes. The positioning member is installed on the base member and arranged between the positioning member and the second frame. The positioning member includes a positioning unit. While an operation state of the support device is switched from a storage state to a first usage state, the first frame is moved away from the base member. When a front end of the first frame is moved to a first location, the positioning unit is embedded in a first positioning hole.

11 Claims, 10 Drawing Sheets

GAMING CONTROLLER AND SUPPORT DEVICE THEREOF

FIELD OF THE INVENTION

The present invention relates to a gaming controller, and more particularly to a gaming controller with a support device.

BACKGROUND OF THE INVENTION

Nowadays, smart phones have become very popular electronic devices. As the performance of the electronic device is gradually increased, the application programs executed in the electronic device are gradually diversified. For example, a mobile game is one of the frequently-used application programs in the smart phone. For playing the mobile game through the smart phone, the user may touch the visual keys corresponding to the mobile game application program through the touch screen of the smart phone in order to control the gaming contents. However, since the display screen of the smart phone is very small, it is inconvenient for the user to play the mobile game through the smart phone. In addition, the possibility of causing the erroneous operation is increased, and the operating accuracy is reduced.

For solving the above drawbacks, a gaming controller in communication with the smart phone through a Bluetooth transmission technology has been introduced into the market. This gaming controller is also referred as a gaming handle or a gaming joystick. The gaming controller is equipped with a phone support device. During operation, the smart phone is fixed on the phone support device. Moreover, the user may operate the physical keys or the joystick of the gaming controller to control the game contents. However, the commercially available gaming controller with the phone support device still has some drawbacks. For example, the phone support device and the main body of the gaming controller are separate components. For using the gaming controller, the phone support device and the main body need to be assembled with each other. That is, the gaming controller is not user-friendly. Moreover, if the phone support device and the main body are frequently assembled and disassembled, the use life of the gaming controller is shortened. Moreover, due to the structural limitations, the gaming controller with the phone support device is not suitable for the mobile phones with various sizes. That is, the gaming controller with the phone support device is only applied to the mobile phones with specified sizes.

Therefore, there is a need of providing an improved gaming controller in order to overcome the above drawbacks.

SUMMARY OF THE INVENTION

An object of the present invention provides a gaming controller with a support device. The support device can be stretched in two stages. According to the operation state of the support device, an object with a corresponding size can be supported by the support device. Consequently, the comfort of operating the support device is enhanced, and the use life is prolonged.

Another object of the present invention a support device. The support device can be stretched in two stages. According to the operation state of the support device, an object with a corresponding size can be supported by the support device. Consequently, the comfort of operating the support device is enhanced, and the use life is prolonged.

The other objects and advantages of the present invention will be understood from the disclosed technical features.

In accordance with an aspect of the present invention, a gaming controller is provided. The gaming controller includes a main body and a support device. The support device is installed on the main body. An object is supported by the support device. The support device includes a base member, a bracket assembly and a positioning member. The base member is installed on the main body. The bracket assembly is installed on the base member and includes a first frame and a second frame. The first frame and the second frame are movable relative to the base member. The first frame includes plural positioning holes. The positioning member is installed on the base member and arranged between the positioning member and the second frame. The positioning member includes a positioning unit. While an operation state of the support device is switched from a storage state to a first usage state, the first frame is moved away from the base member. When a front end of the first frame is moved to a first location outside the base member, the positioning unit is embedded in a first positioning hole of the plural positioning holes, so that the first frame is positioned.

In an embodiment, the bracket assembly further includes a first guiding track and a second guiding track. The first frame is guided by the first guiding track while the first frame is moved relative to the base member. The second frame is guided by the second guiding track while the second frame is moved relative to the base member. The second frame is installed on the first guiding track. While the operation state of the support device is switched from the first usage state to a second usage state, the first frame is continuously moved away from the base member, the first guiding track and second frame are correspondingly moved away from the base member, and the positioning unit is detached from the first positioning hole.

In an embodiment, the bracket assembly further includes a sheltering structure. The first guiding track, the second guiding track, a portion of the first frame and a portion of the second frame are covered by the sheltering structure. An end of the second frame is in contact with the sheltering structure. While the operation state of the support device is switched from the first usage state to the second storage state, the sheltering structure is moved with the second frame and moved away from the base member.

In an embodiment, the bracket assembly further includes a constant force spring. A first end and a second end of the constant force spring are connected with the base member and the second frame, respectively. While the operation state of the support device is switched from the first usage state to the second storage state, the second frame is moved away from the base member to stretch the constant force spring, so that the constant force spring generates an elastic restoring force.

In an embodiment, the bracket assembly further includes a stopping plate. The stopping plate is connected with the front end of the first frame. When the support device is in the first usage state or the second storage state, a clamping space is formed between the stopping plate and the base member. The object is placed in the clamping space, so that the object is clamped between the stopping plate and the base member.

Preferably, while the operation state of the support device is switched from the first usage state to the storage state, the first frame is moved toward the base member, wherein when the front end of the first frame is moved to a second location inside the base member, the positioning unit is embedded in a second positioning hole of the plural positioning holes, so that the first frame is positioned. When the support device is in the storage state, both of the first frame and the second frame are disposed within the base member.

In an embodiment, the positioning member further includes a covering structure and an elastic element. The positioning unit is arranged between the covering structure and the elastic element. A portion of the positioning unit is exposed outside the covering structure. The positioning unit is in close contact with the first frame in response to an elastic force of the elastic element.

In an embodiment, the gaming controller further includes a pivotal mechanism, and the pivotal mechanism is pivotally coupled between the support device and the main body. The support device and the main body are rotatable relative to each other through the pivotal mechanism.

In an embodiment, the first frame and the second frame of the bracket assembly are made of metallic material.

In an embodiment, the positioning unit is a metal ball.

In accordance with an aspect of the present invention, a support device is provided for supporting the object. The support device includes a base member, a bracket assembly and a positioning member. The bracket assembly is installed on the base member, and includes a first frame and a second frame. The first frame and the second frame are movable relative to the base member. The first frame includes plural positioning holes. The positioning member is installed on the base member and arranged between the positioning member and the second frame. The positioning member includes a positioning unit. While an operation state of the support device is switched from a storage state to a first usage state, the first frame is moved away from the base member and a front end of the first frame is in a first location outside the base member, and the positioning unit is embedded in a first positioning hole of the plural positioning holes, so that the first frame is positioned.

From the above descriptions, the present invention provides the gaming controller with the support device. The support device can be stretched in two stages. According to the operation state of the support device (e.g., the fully-open state or the semi-open state), the object with a corresponding size is supported by the support device. In the storage state, the first frame and the second frame can be completely received within the base member and the main body of the gaming controller. Consequently, the gaming controller can be carried by the user more easily. Moreover, due to the cooperation of the positioning holes and the positioning unit (e.g., the metal ball), the first frame can be precisely positioned during the moving process and the obstruction on the first frame is reduced during the stretching or retracting process. Consequently, the comfort of operating the support device is enhanced. Moreover, during the movement of the second frame, the constant force spring is stretched to generate the elastic restoring force. In response to the elastic restoring force, the object can be clamped by the support device more tightly. Moreover, since the first frame and the second frame are made of metallic material and the support device is specially design, the use life of the support device is largely prolonged.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
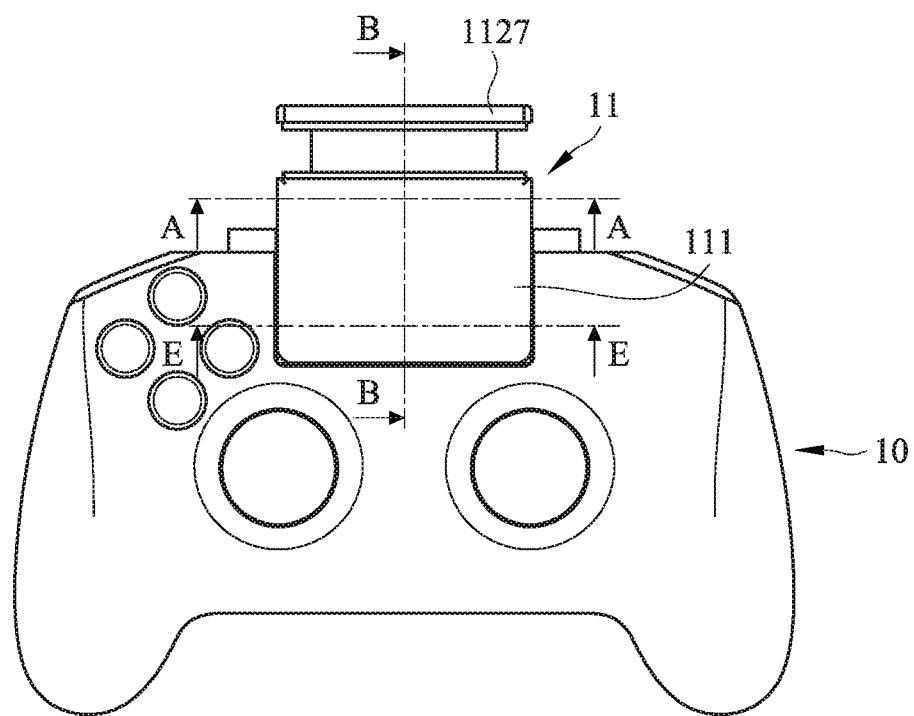
FIG. 1 is a schematic top view illustrating a gaming controller according to an embodiment of the present invention, in which the gaming controller is in a storage state.
Figure 2:
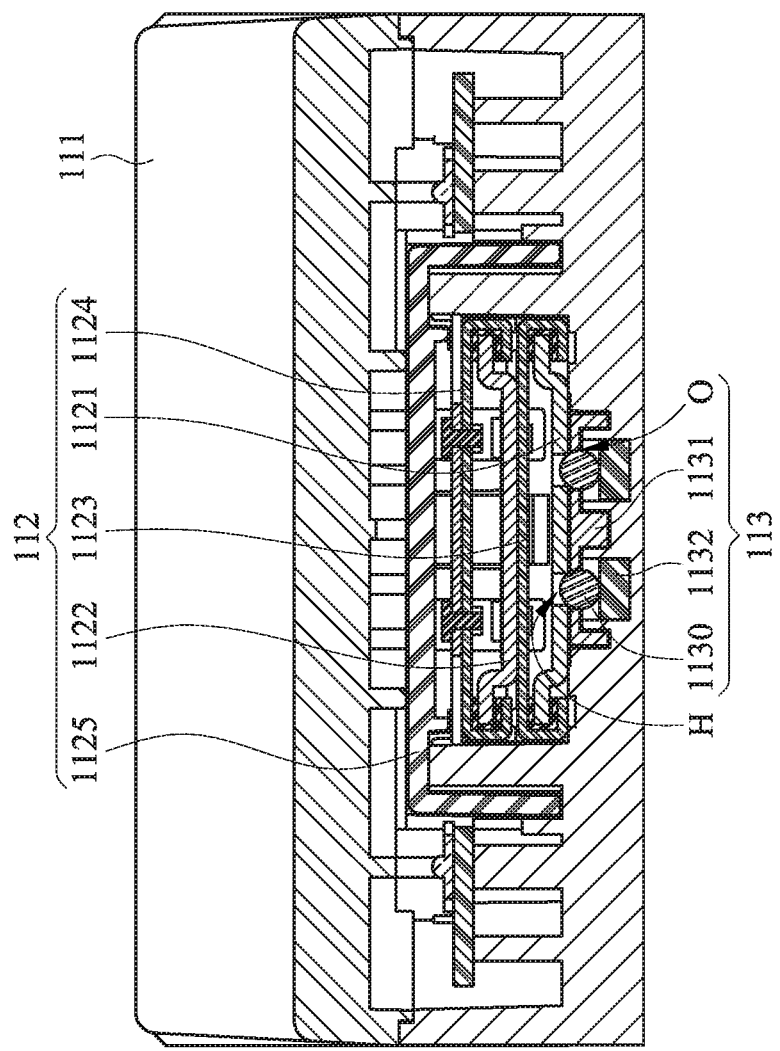
FIG. 2 is a schematic cross-sectional view illustrating the gaming controller as shown in FIG. 1 and taken along the line AA.
Figure 3:
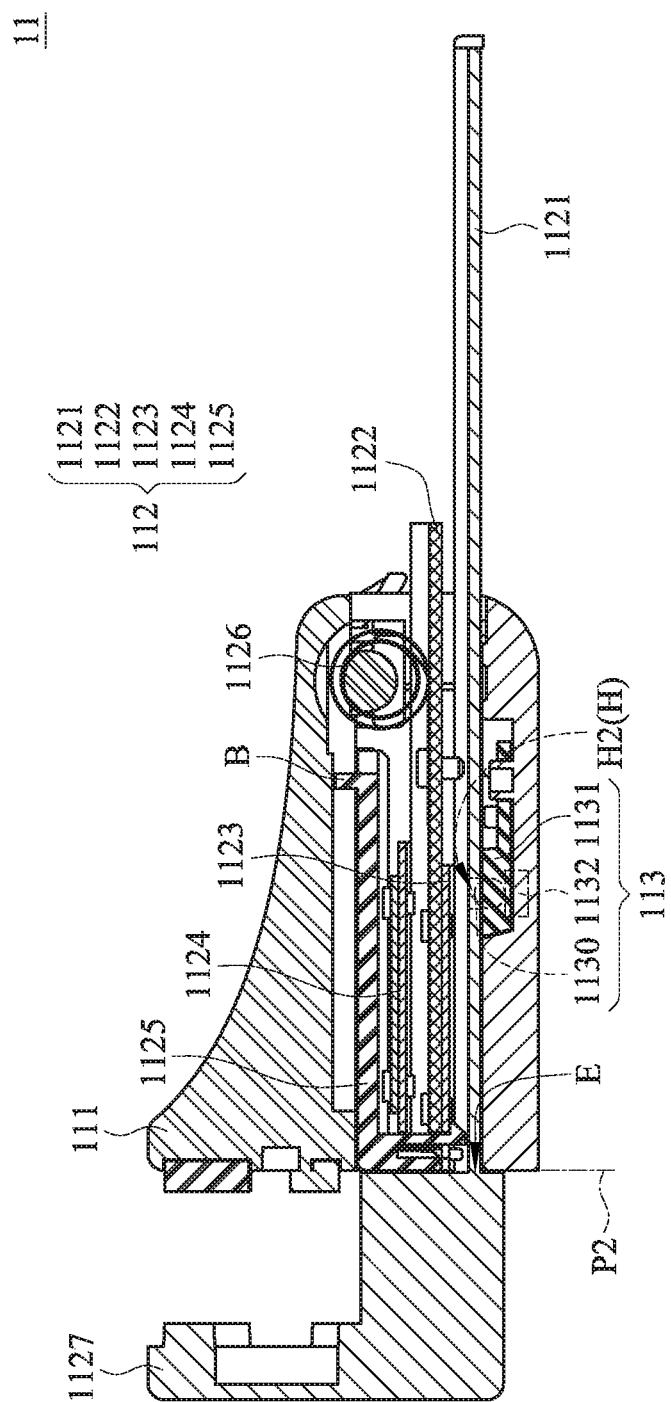
FIG. 3 is a schematic cross-sectional view illustrating the gaming controller as shown in FIG. 1 and taken along the line BB.
Figure 4:
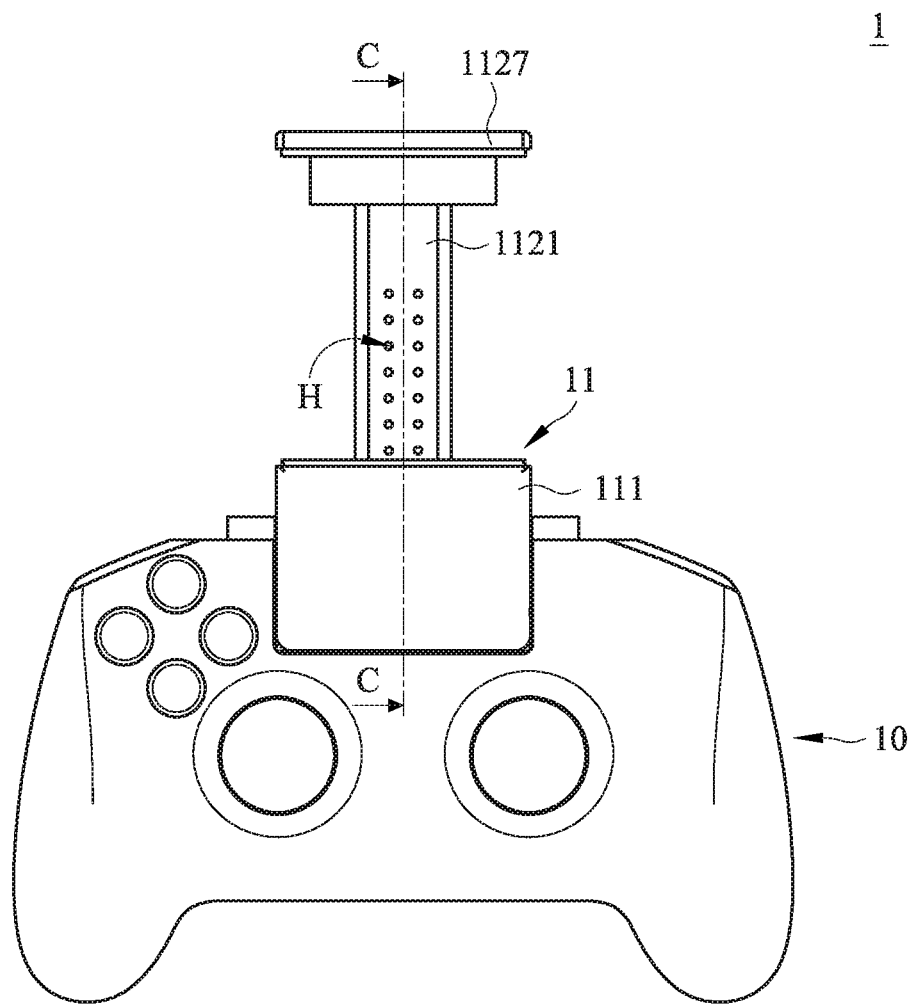
FIG. 4 is a schematic top view illustrating the gaming controller as shown in FIG. 1, in which the support device of the gaming controller is in a first usage state.
Figure 5:
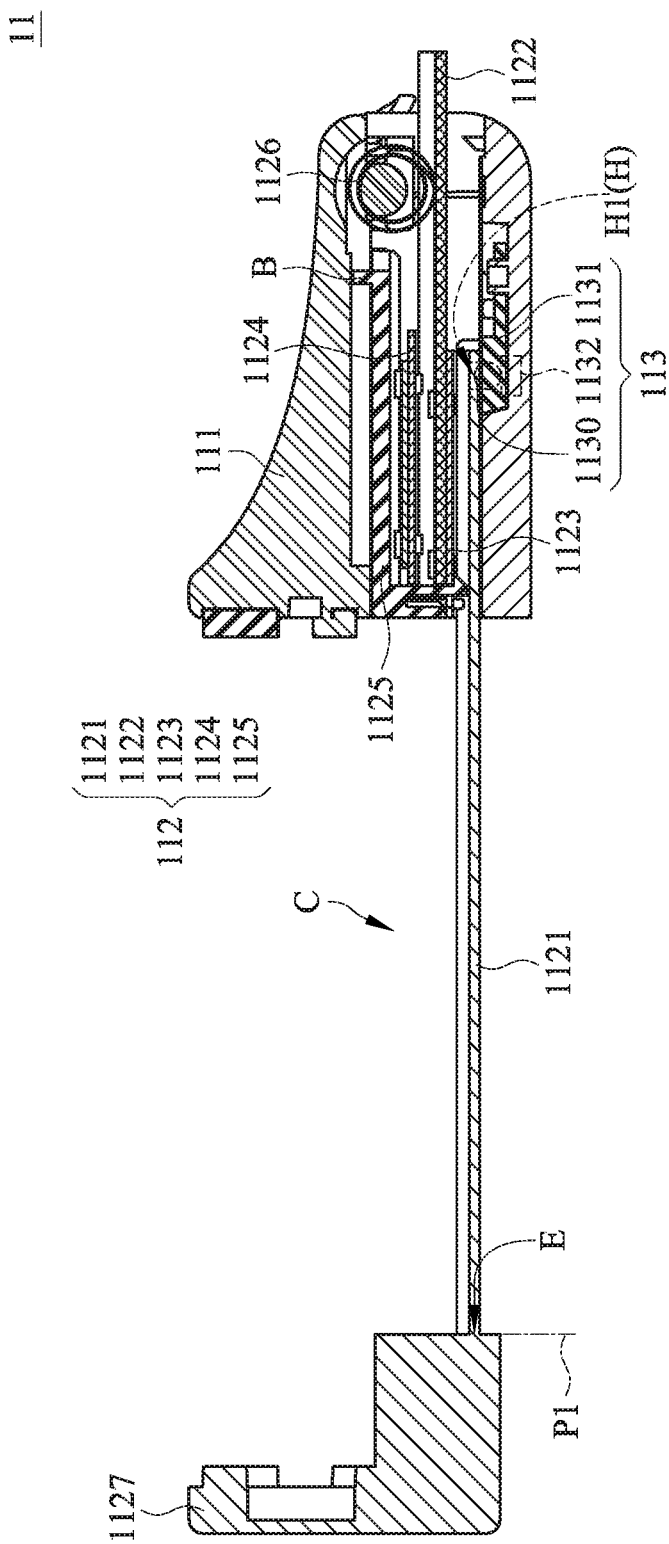
FIG. 5 is a schematic cross-sectional view illustrating the gaming controller as shown in FIG. 4 and taken along the line CC.
Figure 6:
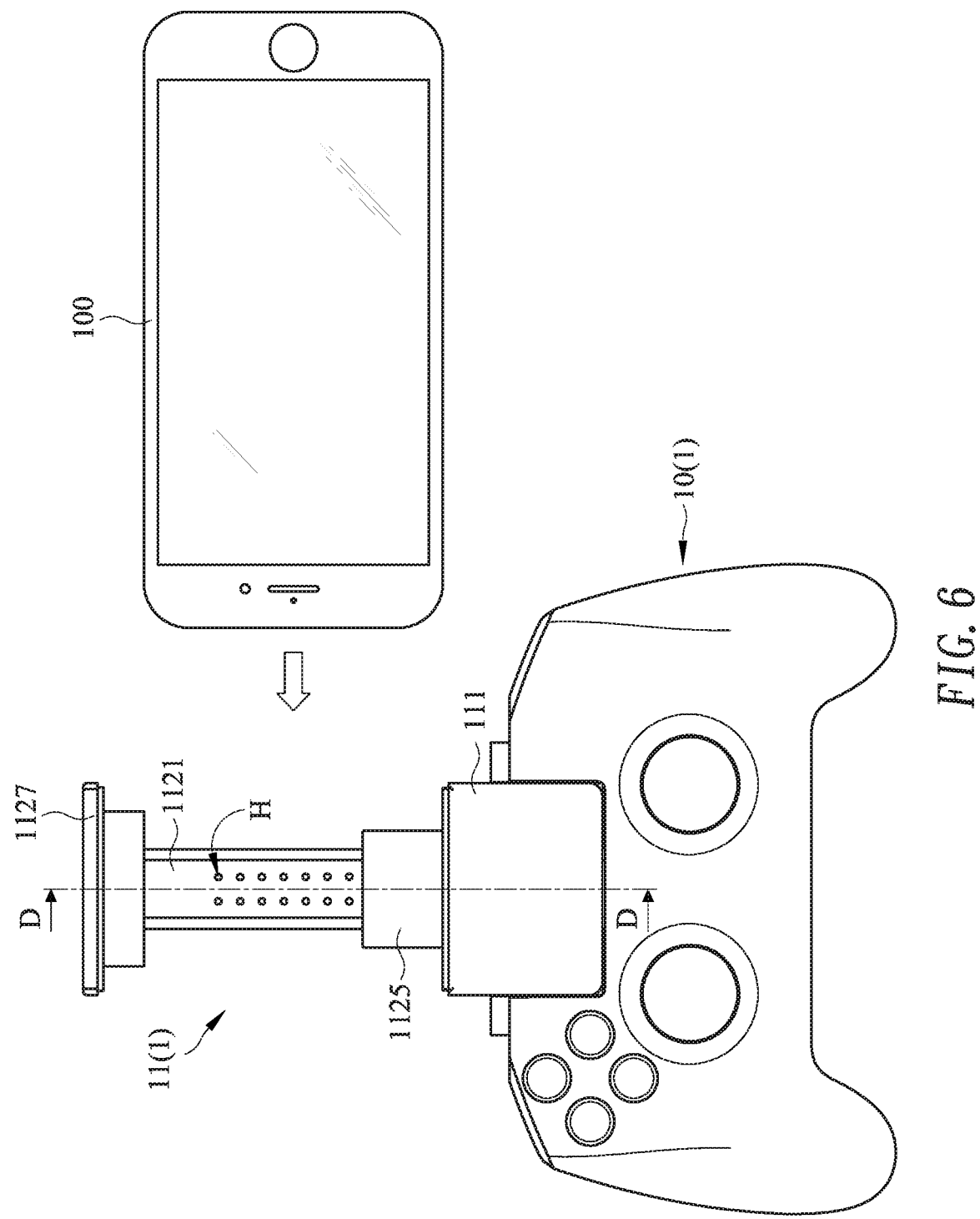
FIG. 6 is a schematic top view illustrating the gaming controller as shown in FIG. 1, in which the support device of the gaming controller is in a second usage state.
Figure 7:
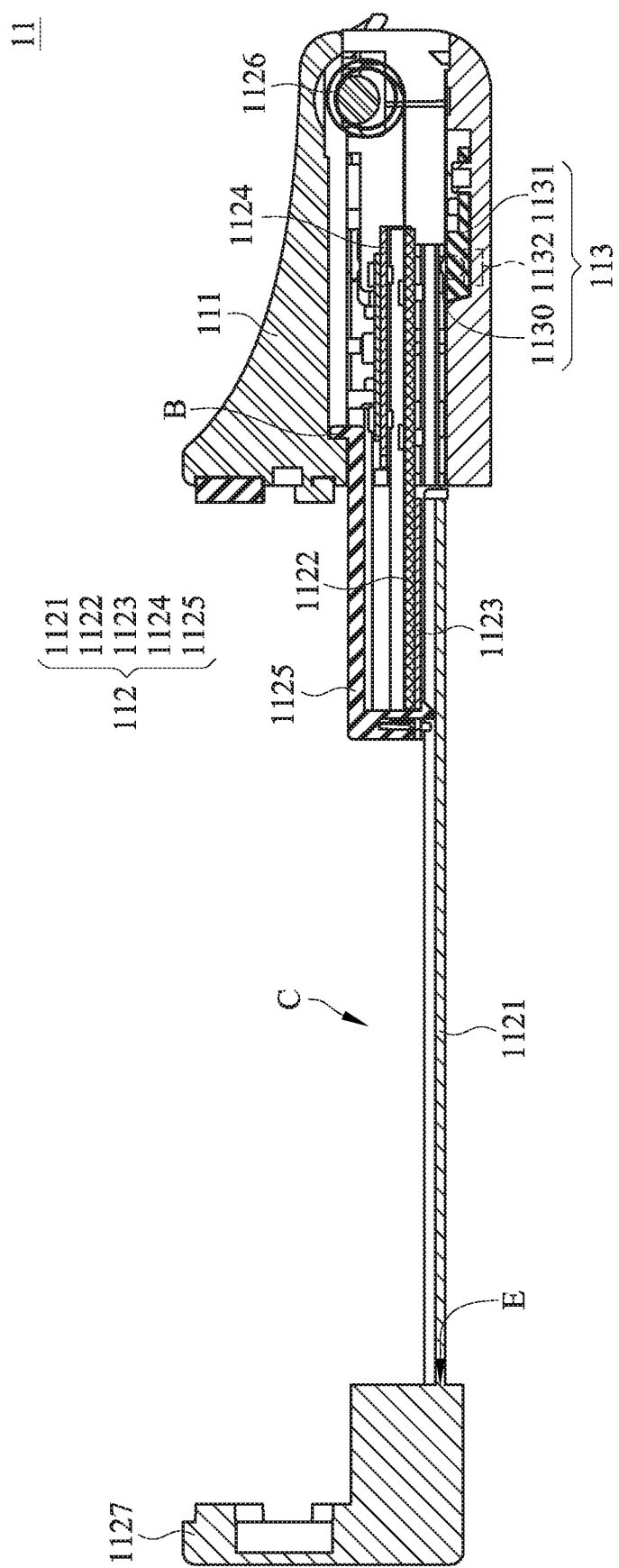
FIG. 7 is a schematic cross-sectional view illustrating the gaming controller as shown in FIG. 6 and taken along the line DD.

Please refer to FIGS. 1 to 7. FIG. 1 is a schematic top view illustrating a gaming controller according to an embodiment of the present invention, in which the gaming controller is in a storage state. FIG. 2 is a schematic cross-sectional view illustrating the gaming controller as shown in FIG. 1 and taken along the line AA. FIG. 3 is a schematic cross-sectional view illustrating the gaming controller as shown in FIG. 1 and taken along the line BB. FIG. 4 is a schematic top view illustrating the gaming controller as shown in FIG. 1, in which the support device of the gaming controller is in a first usage state. FIG. 5 is a schematic cross-sectional view illustrating the gaming controller as shown in FIG. 4 and taken along the line CC. FIG. 6 is a schematic top view illustrating the gaming controller as shown in FIG. 1, in which the support device of the gaming controller is in a second usage state. FIG. 7 is a schematic cross-sectional view illustrating the gaming controller as shown in FIG. 6 and taken along the line DD.

As shown in FIGS. 1 to 7, the gaming controller 1 comprises a main body 10 and a support device 11. For succinctness, only a portion of the support device 11 is shown in FIGS. 3, 5 and 7. The support device 11 is installed on the main body 10. The support device 11 is used for supporting an object 100. Preferably but not exclusively, the object 100 to be supported is a smart phone. In an embodiment, the support device 11 comprises a base member 111, a bracket assembly 112 and a positioning member 113. The base member 111 is installed on the main body 10 of the gaming controller 10. The bracket assembly 112 is installed on the base member 111. The bracket assembly 112 comprises a first frame 1121 and a second frame 1122. The first frame 1121 and the second frame 1122 are movable relative to the base member 111. The first frame 1121 comprises plural positioning holes H. In an embodiment, the plural positioning holes H are discretely arranged along the extending direction of the first frame 1121. It is noted that the way of arranging the positioning holes H is not restricted. In an embodiment, the first frame 1121 and the second frame 1122 are made of metallic material. The positioning member 113 is installed on the base member 111. The first frame 1121 is arranged between the positioning member 113 and the second frame 1122. Moreover, the positioning member 113 comprises at least one positioning unit 1130. Preferably but not exclusively, the positioning unit 1130 is a metal ball. In this embodiment, the base member 111 and the main body 10 are separate components, and the base member 111 and the main body 10 are assembled with each other. It is noted that numerous modifications and alterations may be made while retaining the teachings of the invention. For example, in another embodiment, the base member 111 and the main body 10 are integrally formed.

The operations and the detailed structures of the support device 11 of the gaming controller 1 will be described in more details as follows.

Please refer to FIGS. 1 to 5 again. The bracket assembly 112 further comprises a first guiding track 1123 and a second guiding track 1124. The first frame 1121 is received in the first guiding track 1123. Moreover, while the first frame 1121 is moved relative to the base member 111, the first frame 1121 guided by the first guiding track 1123. The second frame 1122 is received in the second guiding track 1124. Moreover, while the second frame 1122 is moved relative to the base member 111, the second frame 1122 is guided by the second guiding track 1124. The second frame 1122 is installed on the first guiding track 1123.

While the support device 11 is switched from the storage state as shown in FIG. 1 to the first usage state as shown in FIG. 4 (i.e., a semi-open state), the first frame 1121 of the bracket assembly 112 is guided by the first guiding track 1123 and moved in the direction away from the base member 111. When a front end E of the first frame 1121 is moved to a first location P1 outside the base member 111, the positioning unit 1130 of the positioning member 113 is embedded into a first position hole H1 of the plural positioning holes H. Consequently, the first frame 1121 is positioned. Meanwhile, a portion of the first frame 1121 is located outside the base member 111, and the other portion of the first frame 1121 is disposed within the base member 111. Especially, when the support device 11 is in the semi-open state, the first frame 1121 may be moved away from the base member 111 or moved toward the base member 111 according to the practical requirements. In other words, the first frame 1121 can be moved to the desired location.

Please refer to FIGS. 1 to 7 again. The bracket assembly 112 further comprises a sheltering structure 1125. The first guiding track 1123, the second guiding track 1124, a portion of the first frame 1121 and a portion of the second frame 1122 are covered by the sheltering structure 1125. An end of the second frame 1122 is in contact with the sheltering structure 1125. While the support device 11 is switched from the first usage state as shown in FIG. 4 (i.e., the semi-open state) to the second usage state as shown in FIG. 6 (i.e., a fully-open state), the first frame 1121 of the bracket assembly 112 is continuously moved away from the base member 111. When the rear end of the first frame 1121 is moved to the rear end of the first guiding track 1123, the first guiding track 1123 is moved with the first frame 1121. As mentioned above, the second frame 1122 is installed on the first guiding track 1123. Consequently, the second frame 1122 is moved with the first guiding track 1123. That is, the second frame 1122 is correspondingly moved away from the base member 111. In addition, the positioning unit 1130 of the positioning member 113 is detached from the first position hole H1 of the first frame 1121. Meanwhile, the entire of the first frame 1121 is located outside the base member 111, a portion of the second frame 1122 is located outside the base member 111, and the other portion of the second frame 1122 is disposed within the base member 111.

In this embodiment, the sheltering structure 1125 further comprises a stop block B. While the sheltering structure 1125 is moved with the second frame 1122 and moved away from the base member 111 to a predetermined location, the stop block B of the sheltering structure 1125 is stopped by the base member 111. Consequently, the sheltering structure 1125, the second frame 1122 and the first frame 1121 cannot be pulled in the direction away from the base member 111.

Please refer to FIGS. 1 to 7 again. The bracket assembly 112 further comprises a constant force spring 1126 and a stopping plate 1127. A first end and a second end of the constant force spring 1126 are connected with the base member 111 and the second frame 1122, respectively. The stopping plate 1127 is connected with the front end E of the first frame 1121. Moreover, a clamping space C is formed between the stopping plate 1127 and the base member 111. While the support device 11 is switched from the first usage state as shown in FIG. 4 (i.e., the semi-open state) to the second usage state as shown in FIG. 6 (i.e., a fully-open state), the second frame 1122 is correspondingly moved with the first frame 1221 and moved away from the base member 111. At the same time, the constant force spring 1126 is stretched. Consequently, the constant force spring 1126 generates an elastic restoring force. Then, the object 100 is placed in the clamping space C between the stopping plate 1127 and the base member 111. Since the constant force spring 1126 is connected with the second frame 1122, the elastic restoring force is provided to the second frame 1122. The elastic restoring force is also provides to the stopping plate 1127, which is connected with the front end E of the first frame 1121. Consequently, the object 100 can be clamped between the stopping plate 1127 and the base member 111. In other words, the object 100 can be clamped between the stopping plate 1127 and the base member 111 in response to the elastic restoring force when the support device 11 is in the second usage state (i.e., a fully-open state).

Please refer to FIGS. 1 to 5 again. While the support device 11 is switched from the first usage state as shown in FIG. 4 (i.e., the semi-open state) to the storage state as shown in FIG. 1, the first frame 1121 is moved toward the base member 111. When the front end E of the first frame 1121 is moved to a second location P2 of the base member 111, the positioning unit 1130 of the positioning member 113 is embedded into a second position hole H2 of the plural positioning holes H. Consequently, the first frame 1121 is positioned. In the storage state, the first frame 1121 and the second frame 1122 are completely received within the base member 111, and a portion of the first frame 1121 and a portion of the second frame 1122 are received within the main body 10 of the gaming controller 1.

Please refer to FIG. 2 again. The positioning member 113 further comprises a covering structure 1131 and an elastic element 1132. The positioning unit 1130 is arranged between the covering structure 1131 and the elastic element 1132. Moreover, a portion of the positioning unit 1130 is exposed outside the covering structure 1131. In an embodiment, the covering structure 1131 has an opening O. The positioning unit 1130 is partially penetrated through the opening O and contacted with the first frame 1121. The elastic element 1132 provides an elastic force to the positioning unit 1130. In response to the elastic force, the positioning unit 1130 is contacted with the first frame 1121 more tightly. As mentioned above, the positioning unit 1130 is a metal ball. Consequently, while the first frame 1121 is moved away from the base member 111 or moved toward the base member 111 (i.e., in the semi-open state), the first frame 1121 is slid on the metal ball. Consequently, the obstruction on the moving first frame 1121 is reduced. Moreover, during the movement of the first frame 1121, the metal ball is embedded into and detached from the positioning holes H of the first frame 1121 sequentially. In other words, the clear click feel is provided to the user during the movement of the first frame 1121.

Figure 8:
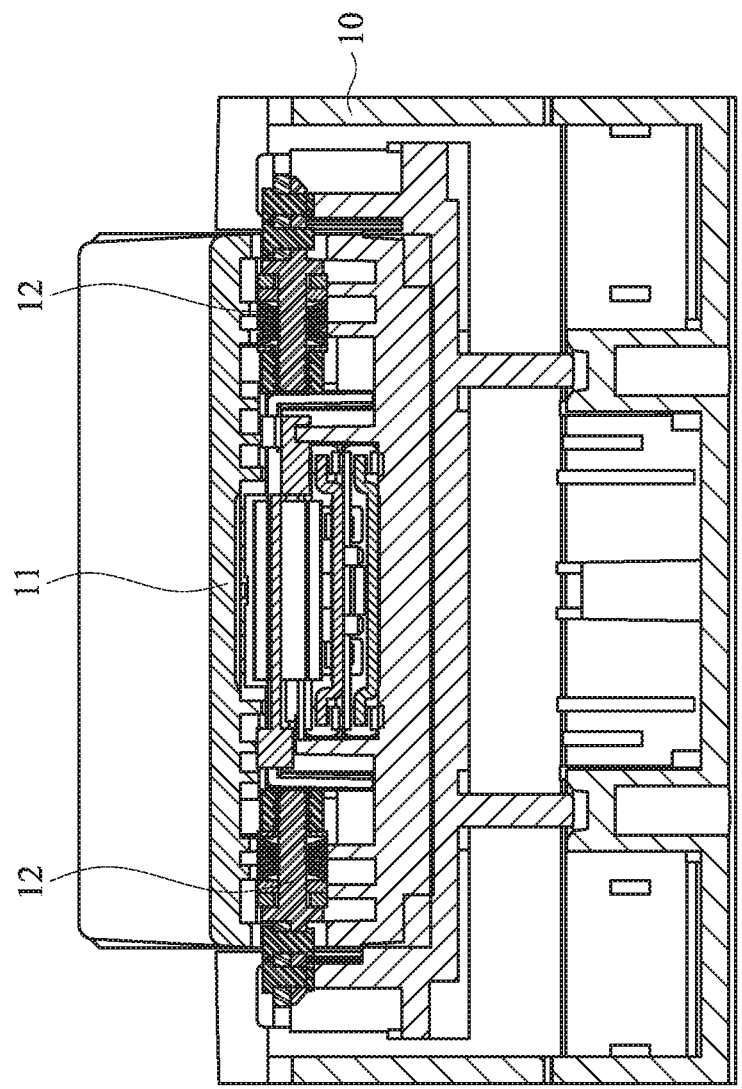
FIG. 8 is a schematic cross-sectional view illustrating the gaming controller as shown in FIG. 1 and taken along the line EE.
Figure 9:
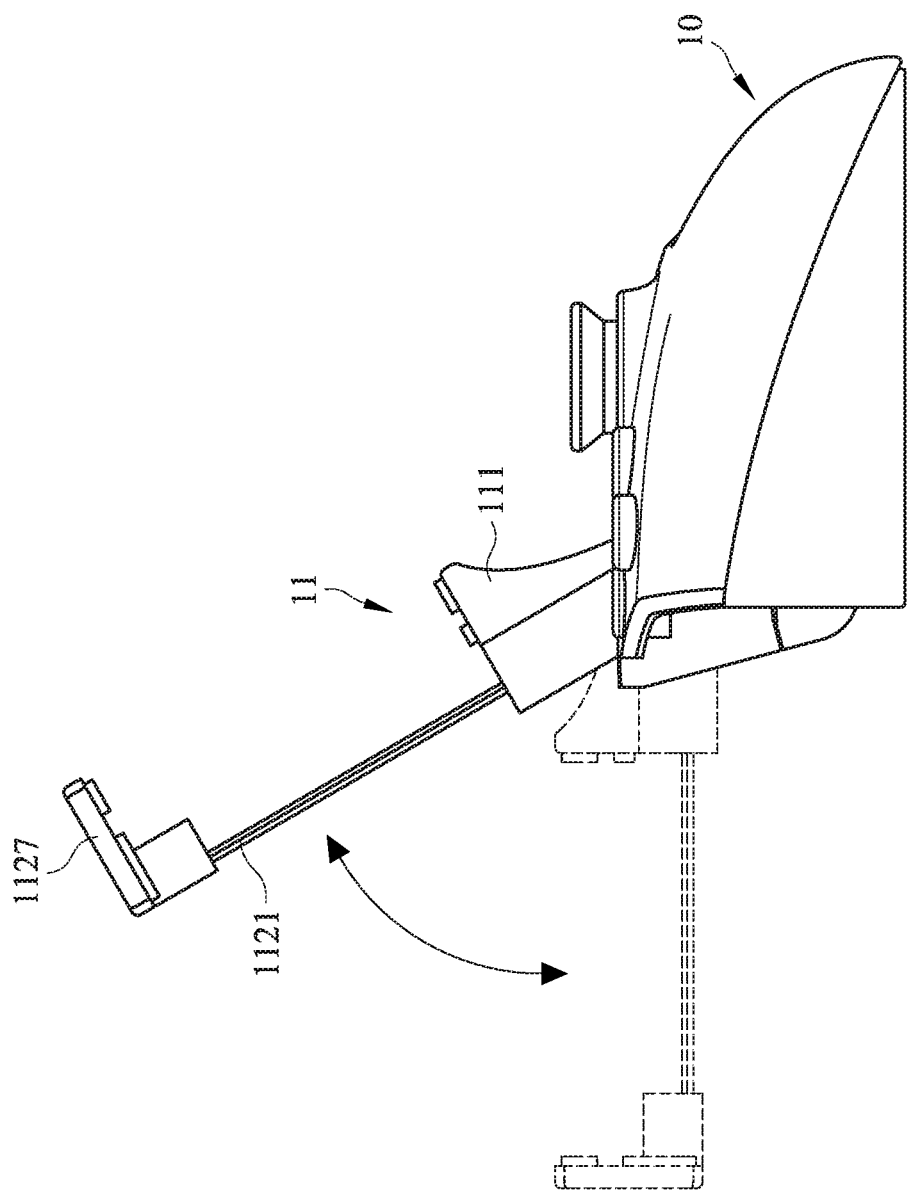
FIG. 9 schematically illustrates the gaming controller rotation as shown in FIGS. 4 and 5, in which the support device is rotated relative to the main body of the gaming controller.
Figure 10:
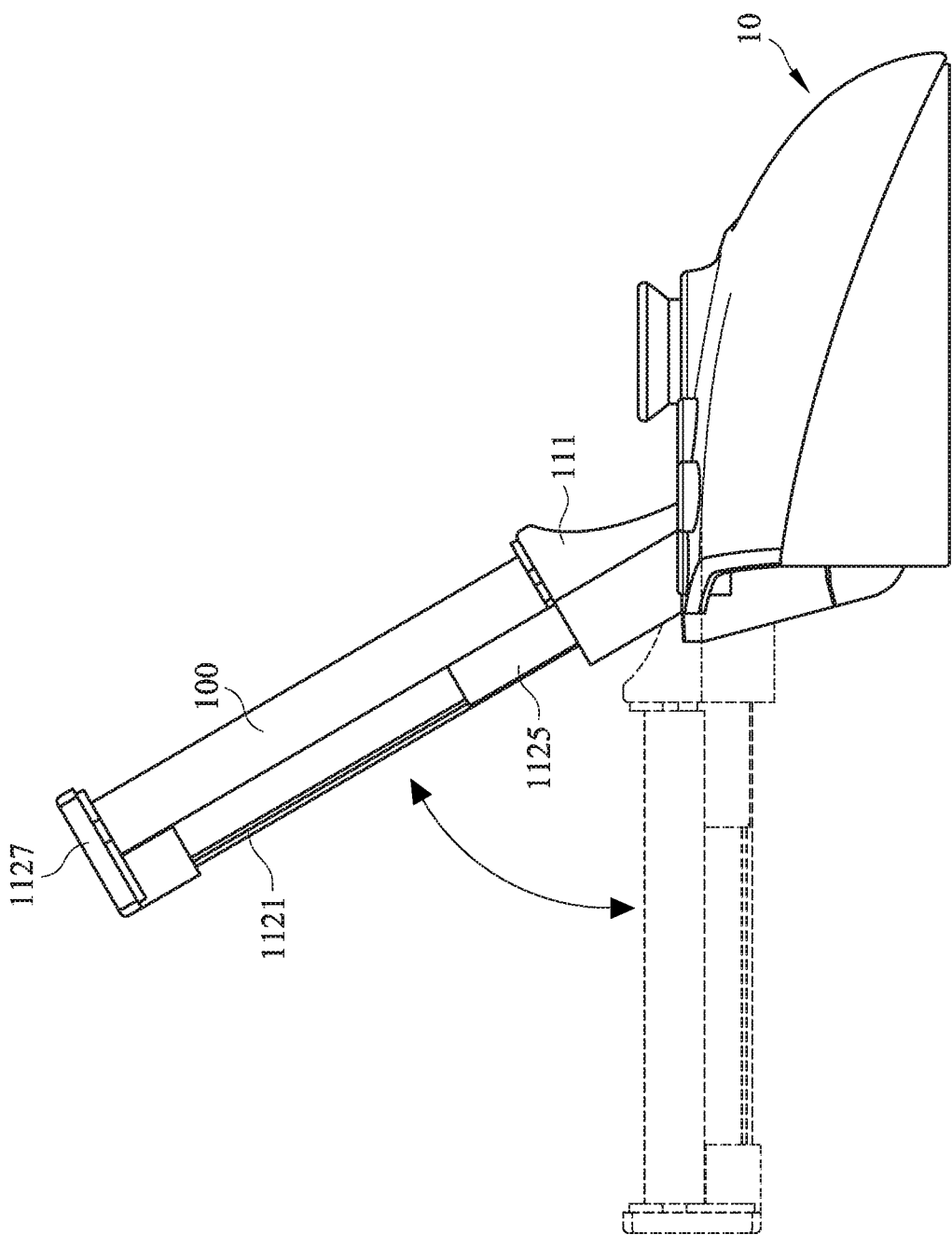
FIG. 10 schematically illustrates the gaming controller rotation as shown in FIGS. 6 and 7, in which the support device is rotated relative to the main body of the gaming controller.

Please refer to FIGS. 8 to 10. FIG. 8 is a schematic cross-sectional view illustrating the gaming controller as shown in FIG. 1 and taken along the line EE. FIG. 9 schematically illustrates the gaming controller rotation as shown in FIGS. 4 and 5, in which the support device is rotated relative to the main body of the gaming controller. FIG. 10 schematically illustrates the gaming controller rotation as shown in FIGS. 6 and 7, in which the support device is rotated relative to the main body of the gaming controller.

As shown in FIG. 8, the gaming controller 1 further comprises a pivotal mechanism 12. The pivotal mechanism 12 is pivotally coupled between the support device 11 and the main body 10 of the gaming controller 1. The support device 11 and the main body 10 are rotatable relative to each other through the pivotal mechanism 12. In the first usage state (i.e., the semi-open state) as shown in FIG. 9, the support device 11 is rotatable relative to the main body 10 by a rotating angle in the range between 0 and 60 degree. In the second usage state (i.e., the fully-open state) as shown in FIG. 10, the support device 11 is rotatable relative to the main body 10 by a rotating angle in the range between 0 and 60 degree.

From the above descriptions, the present invention provides the gaming controller with the support device. The support device can be stretched in two stages. According to the operation state of the support device (e.g., the fully-open state or the semi-open state), the object with a corresponding size is supported by the support device. In the storage state, the first frame and the second frame can be completely received within the base member and the main body of the gaming controller. Consequently, the gaming controller can be carried by the user more easily. Moreover, due to the cooperation of the positioning holes and the positioning unit (e.g., the metal ball), the first frame can be precisely positioned during the moving process and the obstruction on the first frame is reduced during the stretching or retracting process. Consequently, the comfort of operating the support device is enhanced. Moreover, during the movement of the second frame, the constant force spring is stretched to generate the elastic restoring force. In response to the elastic restoring force, the object can be clamped by the support device more tightly. Moreover, since the first frame and the second frame are made of metallic material and the support device is specially design, the use life of the support device is largely prolonged.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A gaming controller, comprising:
   a main body; and
   a support device installed on the main body, wherein an object is supported by the support device, and the support device comprises a base member, a bracket assembly and a positioning member, wherein the base member is installed on the main body, the bracket assembly is installed under the base member and comprises a first frame and a second frame over the first frame, the first frame and the second frame are movable away from and back to the base member, the first frame comprises plural positioning holes, the positioning member is installed under the base member, and the first frame is arranged between the positioning member and the second frame, and the positioning member comprises a positioning unit,
   wherein while an operation state of the support device is switched from a storage state to a first usage state, the first frame is moved away from the base member, wherein when a front end of the first frame is moved to a first location outside the base member, the positioning unit is embedded in a first positioning hole of the plural positioning holes, so that the first frame is positioned,
   wherein while the operation state of the support device is switched from the first usage state to a second usage state, the positioning unit is detached from the first positioning hole, and the first frame is continuously moved away from the base member, and the second frame is correspondingly moved with the first frame and moved away from the base member.

2. The gaming controller according to claim 1, wherein the bracket assembly further comprises a first guiding track and a second guiding track, wherein the first frame is guided by the first guiding track while the first frame is moved relative to the base member, and the second frame is guided by the second guiding track while the second frame is moved relative to the base member, and the second frame is installed on the first guiding track, wherein while the operation state of the support device is switched from the first usage state to the second usage state, the first guiding track and the second frame are correspondingly moved away from the base member.

3. The gaming controller according to claim 2, wherein the bracket assembly further comprises a sheltering structure, wherein the first guiding track, the second guiding track, a portion of the first frame and a portion of the second frame are covered by the sheltering structure, and an end of the second frame is in contact with the sheltering structure, wherein while the operation state of the support device is switched from the first usage state to the second storage state, the sheltering structure is moved with the second frame and moved away from the base member.

4. The gaming controller according to claim 2, wherein the bracket assembly further comprises a constant force spring, and a first end and a second end of the constant force spring are connected with the base member and the second frame, respectively, wherein while the operation state of the support device is switched from the first usage state to the second storage state, the second frame is moved away from the base member to stretch the constant force spring, so that the constant force spring generates an elastic restoring force.

5. The gaming controller according to claim 2, wherein the bracket assembly further comprises a stopping plate, and the stopping plate is connected with the front end of the first frame, wherein when the support device is in the first usage state or the second storage state, a clamping space is formed between the stopping plate and the base member, wherein the object is placed in the clamping space, so that the object is clamped between the stopping plate and the base member.

6. The gaming controller according to claim 1, wherein while the operation state of the support device is switched from the first usage state to the storage state, the first frame is moved toward the base member, wherein when the front end of the first frame is moved to a second location inside the base member, the positioning unit is embedded in a second positioning hole of the plural positioning holes, so that the first frame is positioned, wherein when the support device is in the storage state, both of the first frame and the second frame are disposed within the base member.

7. The gaming controller according to claim 1, wherein the positioning member further comprises a covering structure and an elastic element, wherein the positioning unit is arranged between the covering structure and the elastic element, a portion of the positioning unit is exposed outside the covering structure, and the positioning unit is in close contact with the first frame in response to an elastic force of the elastic element.

8. The gaming controller according to claim 1, wherein the gaming controller further comprises a pivotal mechanism, and the pivotal mechanism is pivotally coupled between the support device and the main body, wherein the support device and the main body are rotatable relative to each other through the pivotal mechanism.

9. The gaming controller according to claim 1, wherein the first frame and the second frame of the bracket assembly are made of metallic material.

10. The gaming controller according to claim 1, wherein the positioning unit is a metal ball.

11. A support device for supporting the object, the support device comprising:

a base member;

a bracket assembly installed under the base member, and comprising a first frame and a second frame over the first frame, wherein the first frame and the second frame are movable away from and back to the base member, and the first frame comprises plural positioning holes; and a positioning member installed under the base member, and the first frame arranged between the positioning member and the second frame, wherein the positioning member comprises a positioning unit, wherein while an operation state of the support device is switched from a storage state to a first usage state, the first frame is moved away from the base member and a front end of the first frame is in a first location outside the base member, and the positioning unit is embedded in a first positioning hole of the plural positioning holes, so that the first frame is positioned, wherein while the operation state of the support device is switched from the first usage state to a second usage state, the positioning unit is detached from the first positioning hole, and the first frame is continuously moved away from the base member, and the second frame is correspondingly moved with the first frame and moved away from the base member.

* * * * *